United States Patent
Kunberger

(10) Patent No.: US 11,391,416 B2
(45) Date of Patent: Jul. 19, 2022

(54) PRESSURE VESSEL ARRANGEMENT AND VEHICLE HAVING SAID PRESSURE VESSEL ARRANGEMENT

(71) Applicant: Bayerische Motoren Werke Aktiengesellschaft, Munich (DE)

(72) Inventor: Jan-Mark Kunberger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 388 days.

(21) Appl. No.: 16/545,043

(22) Filed: Aug. 20, 2019

(65) Prior Publication Data

US 2020/0011485 A1    Jan. 9, 2020

Related U.S. Application Data

(63) Continuation of application No. PCT/EP2018/051944, filed on Jan. 26, 2018.

(30) Foreign Application Priority Data

Feb. 24, 2017  (DE) ..................... 10 2017 203 093.3

(51) Int. Cl.
*F17C 13/12*    (2006.01)
*B60K 15/03*    (2006.01)
*B60K 15/063*   (2006.01)

(52) U.S. Cl.
CPC .............. *F17C 13/12* (2013.01); *B60K 15/03* (2013.01); *B60K 15/063* (2013.01);
(Continued)

(58) Field of Classification Search
CPC .............. F17C 13/12; F17C 2201/0109; F17C 2201/035; F17C 2260/042;
(Continued)

(56) References Cited

U.S. PATENT DOCUMENTS 5,701,928 A * 12/1997 Aoki ..................... F17C 13/123
137/312
5,820,161 A   10/1998 Svensson
(Continued)

FOREIGN PATENT DOCUMENTS

DE   10 2012 006 367 A1   4/2013
DE   10 2012 019 945 A1   4/2013
(Continued)

OTHER PUBLICATIONS

International Search Report (PCT/ISA/210) issued in PCT Application No. PCT/EP2018/051944 dated Apr. 5, 2018 with English translation (six (6) pages).
(Continued)

*Primary Examiner* — Tony H Winner
*Assistant Examiner* — Michael R Stabley
(74) *Attorney, Agent, or Firm* — Crowell & Moring LLP

(57) ABSTRACT

A pressure vessel arrangement has a pressure vessel for storing a gaseous fuel and a conducting arrangement arranged adjacent to the pressure vessel for conducting and weakening a shock wave occurring upon bursting of the pressure vessel. The conducting arrangement forms a chamber space that can be expanded by the shock wave. The conducting arrangement has an inlet into the space facing the pressure vessel, via which the shock wave enters the space and expands the space, and wherein the conducting arrangement has at least one outlet out of the space, via which the shock wave exits the space into the environment.

19 Claims, 3 Drawing Sheets

(52) U.S. Cl.
CPC ............. *B60K 2015/03315* (2013.01); *B60K 2015/0634* (2013.01); *F17C 2201/0109* (2013.01); *F17C 2201/035* (2013.01); *F17C 2201/056* (2013.01); *F17C 2221/012* (2013.01); *F17C 2221/033* (2013.01); *F17C 2260/042* (2013.01); *F17C 2270/0178* (2013.01)

(58) Field of Classification Search
CPC ....... F17C 2270/0178; F17C 2221/033; B60K 15/03; B60K 15/063; B60K 2015/03315; B60K 2015/0634
See application file for complete search history.

(56) References Cited

U.S. PATENT DOCUMENTS

| | | | |
|---|---|---|---|
| 6,418,962 B1 * | 7/2002 | Wozniak | B60K 15/07 137/266 |
| 6,564,833 B2 | 5/2003 | Ono et al. | |
| 7,270,209 B2 * | 9/2007 | Suess | B60K 15/03006 180/69.5 |
| 8,888,128 B1 | 11/2014 | Seo | |
| 10,076,956 B2 * | 9/2018 | Ohashi | B60K 1/00 |
| 2013/0199399 A1 | 8/2013 | Young et al. | |
| 2016/0200191 A1 * | 7/2016 | Ito | B60K 15/073 280/834 |
| 2019/0291573 A1 * | 9/2019 | Banno | B62D 25/20 |

FOREIGN PATENT DOCUMENTS

| | | |
|---|---|---|
| DE | 10 2014 221 530 A1 | 5/2015 |
| DE | 10 2016 212 278 A1 | 1/2018 |
| JP | 2003-229150 A | 8/2003 |
| JP | 2007-326474 A | 12/2007 |
| JP | 2010-70028 A | 4/2010 |
| JP | 2014-19191 A | 2/2014 |
| WO | WO 2012/172401 A1 | 12/2012 |

OTHER PUBLICATIONS

German-language Written Opinion (PCT/ISA/237) issued in PCT Application No. PCT/EP2018/051944 dated Apr. 5, 2018 (seven (7) pages).
German-language Search Report issued in counterpart German Application No. 102017203093.3 dated Jan. 19, 2018 with partial English translation (17 pages).

* cited by examiner

PRESSURE VESSEL ARRANGEMENT AND VEHICLE HAVING SAID PRESSURE VESSEL ARRANGEMENT

CROSS REFERENCE TO RELATED APPLICATIONS

This application is a continuation of PCT International Application No. PCT/EP2018/051944, filed Jan. 26, 2018, which claims priority under 35 U.S.C. § 119 from German Patent Application No. 10 2017 203 093.3, filed Feb. 24, 2017, the entire disclosures of which are herein expressly incorporated by reference.

BACKGROUND AND SUMMARY OF THE INVENTION

The technology disclosed here relates to a pressure vessel arrangement and a vehicle equipped with it. In particular, a technology is presented which reduces as much as possible the damage resulting from a bursting of the pressure vessel.

The prior art is familiar with various usage possibilities for pressure vessels for the storing of a gaseous fuel. For example, such pressure vessels are used in vehicles for the storage of hydrogen or natural gas. In the very unlikely case, for example by external thermal influences, the pressure vessel may burst. DE 10 2014 221 530 A1 shows one possibility for slowing down the shock wave within the pressure vessel, so that the shock wave emerging from the pressure vessel has the least possible energy. For this, DE 10 2014 221 530 A1 discloses a pressure vessel with elements provided in the tank storage space that form partial volumes, each with at least one gas overflow opening inside the tank storage space. The rigidity of the elements, also known as flow decelerating elements, is so slight that in the theoretical case of a partial volume filled with gas under high pressure and having only closed gas overflow openings, this pressurized gas cannot be held in the respective partial volumes. Furthermore, these flow decelerating elements when abutting against the wall of the tank storage space do not significantly support it. The flow decelerating elements may be formed as hollow or spherical shaped bodies made of carbon fiber plastic.

One preferred problem which the technology disclosed here proposes to solve is to lessen or do away with at least one drawback of a previously known solution or to propose an alternative solution. In particular, the pressure vessel arrangement presented here should reduce as much as possible the potential damage resulting from the shock wave produced upon bursting of the pressure vessel.

The present technology shows one possibility for conducting the shock wave in a particular direction outside the pressure vessel. In this way, it is possible to conduct the shock wave in a direction in which the least possible physical damage and/or personal injury is expected. The shock wave may also be conducted in a direction in which it can be further weakened (e.g., the engine compartment or the wheels) before it impacts against persons. It is especially advantageous when precautions for shock wave deceleration are already provided inside the pressure vessel, so that the shock wave emerging from the pressure vessel has the least possible energy. Such precautions for shock wave deceleration are shown for example by the above mentioned document DE 10 2014 221 530 A1. The shock wave heavily reduced by flow decelerating elements, such as those of DE 10 2014 221 530 A1, should be further reduced by the proposed conducting arrangement, so that the consequences of the shock wave can be further mitigated.

The problem is solved by a pressure vessel arrangement. The pressure vessel arrangement comprises a pressure vessel for the storage of a gaseous fuel. The fuel is gaseous under ambient conditions. In particular, the fuel is compressed natural gas (CNG), liquefied natural gas (LNG) or hydrogen. The pressure vessel is in particular a cryogenic pressure vessel (CcH2) or a high-pressure gas vessel (CGH2). High-pressure gas vessels are designed to store fuel substantially at ambient temperatures for a long time at a nominal working pressure (NWP) of around 350 barg (bar gauge, or bar above atmospheric pressure), more preferably around 700 barg or higher. A cryogenic pressure vessel is suited to storing the fuel at the mentioned working pressures even at temperatures significantly below the ambient temperature. The pressure vessel preferably has flow decelerating elements per DE 10 2014 221 530 A1.

Moreover, the pressure vessel arrangement comprises a conducting arrangement. The conducting arrangement is situated "adjacent" to the pressure vessel. Thus, the conducting arrangement is not situated inside the pressure vessel or its walls. Moreover, neither is the conducting arrangement simply a shell enclosing the pressure vessel.

The conducting arrangement is designed to conduct and preferably weaken a shock wave arising upon bursting (or breaking) of the pressure vessel. In the very unlikely event that the pressure vessel bursts, the shock wave so produced emerges from the destroyed pressure vessel and is weakened by the conducting arrangement and guided in at least one particular direction. In particular, it is provided that the conducting arrangement weakens the shock wave by scattering it perpendicular to the main flow direction.

Preferably, the conducting arrangement itself may also contain flow decelerating elements similar to those in DE 10 2014 221 530 A1. The conducting arrangement forms an expandable space. In particular, the conducting arrangement forms a wall surrounding the expandable space. This space is expanded by the entry of the shock wave into the conducting arrangement. Before the shock wave enters into the conducting arrangement, this space is not expanded or at least not fully expanded, so that the conducting arrangement can be arranged in very space-saving and nonvisible manner.

The conducting arrangement comprises an inlet. The inlet leads into the expandable space and is facing toward the pressure vessel. The shock wave arriving from the destroyed pressure vessel can enter into the expandable space through this inlet and thus expand the space.

Moreover, the conducting arrangement comprises at least one outlet from the space. Through this at least one outlet, the shock wave leaves the space heading toward the surroundings. The conducting arrangement guides the shock wave from the inlet or from the pressure vessel up to the at least one outlet, ideally being already weakened in this process. In this way, the conducting arrangement dictates at least one direction for the shock wave, or multiple directions when multiple outlets are used.

Besides the inlet and outlet, the conducting arrangement comprises "closed regions" which can be formed in the most varied of ways. Thus, it shall be described in detail in the following that the conducting arrangement can be formed for example by a tube made of fabric, a netting, or a film. The inlet and the outlet are corresponding openings in the tube. The non-opened regions of the tube form the closed regions of the conducting arrangement. The shock wave will not emerge via these closed regions, or only emerge in very weakened form. However, the closed regions need not be completely tight, but instead may also have smaller openings, so that the shock wave in extremely weakened form can also emerge from the space through the closed regions. Thus, the conducting arrangement may also have lateral openings, through which a portion of the shock wave can be diverted and thus scattered, especially to the side of the vehicle. In this way, the shock wave is diverted and thus weakened not only through the above-described outlet, but also through the further openings, into the surroundings.

The conducting arrangement is designed so that it can be expanded by the shock wave. There are various preferred possibilities for this, which can also be combined with one another in a single conducting arrangement, especially if they are used only for one section of the conducting arrangement:

Preferably, the conducting arrangement is formed of an elastic material, at least for a section. This elastic material may be stretched upon entry of the shock wave into the conducting arrangement and thus upon expanding of the space. Preferably, the conducting arrangement is formed from an elastomer, at least for a section.

Moreover, it is preferably provided that the conducting arrangement is formed of a plastically deformable material, at least for a section. This plastically deformable material may become deformed upon entry of the shock wave into the conducting arrangement and thus upon expanding of the space. In particular, plastic will be used as the plastically deformable material, which is stretched by the pressure of the shock wave in the expanding space.

Furthermore, it is preferably provided that the conducting arrangement prior to the expanding of the space is present at least for a section in the folded-up and/or crumpled-up and/or rolled-up form. The folded-up and/or crumpled-up portion of the conducting arrangement is deployed by the entry of the shock wave into the conducting arrangement. In particular, a flexible material will be used for this embodiment. However, an appropriately folded metal sheet which can be unfolded by the pressure of the shock wave can also be used.

The conducting arrangement is formed preferably at least for a section from a flexible material, especially a netting and/or a fabric and/or a film. The flexible material may be elastically and/or plastically deformable at least for a section. Moreover, this flexible material may be present at least for a section in the folded-up and/or crumpled-up form.

The conducting arrangement is preferably formed by a tube. The inlet and outlet are openings on the tube. Alternatively, the form of the conducting arrangement may also be called a bag with corresponding openings for inlet and outlet. In particular, the above described use of the flexible material is suitable for the forming of the tube or bag.

The space expanded by the shock wave forms a particular volume with a particular surface according to the configuration of the conducting arrangement. This surface is termed here the "overall surface" of the expanded space. The overall surface is formed from the sum of the areas of the inlet, the at least one outlet, and the closed regions of the conducting arrangement. The smaller the area of the outlet, the better the shock wave can be directed. The area of the inlet results basically from the size of the pressure vessel or the expected opening in the pressure vessel in event of its bursting.

Thus, it is preferably provided that the overall surface is enclosed by the closed regions for at least 30%, preferably for at least 50%, especially preferably for at least 70%, and the remaining portion of the overall surface is open through the inlet and outlet.

The conducting arrangement is preferably secured to the pressure vessel or a structure arranged above it. The structure above it is one that receives the pressure vessel, such as a vehicle. This fastening ensures that the conducting arrangement remains in the predefined place and the shock wave can enter the expandable space through the inlet. In particular, the inlet of the conducting arrangement is secured to the pressure vessel or the structure above it.

The described pressure vessel arrangement is used in particular in a vehicle. The vehicle in particular is a road vehicle, such as a car or a truck. Depending on the arrangement of the pressure vessel in the vehicle and depending on the configuration of the vehicle, the shock wave might emerge at undesirable places or heavily damage parts of the vehicle, without the conducting arrangement according to the invention. In particular, the present technology in combination with flow decelerating elements in the pressure vessel, such as those per DE 10 2014 221 530 A1, results in a weakening of the shock wave in the pressure vessel and a diverting of the shock wave outside the pressure vessel, possibly with further weakening. For example, if the pressure vessel is situated centrally in the vehicle and near the bottom, the shock wave will propagate primarily downward and to the side. The doors are located at the side of the vehicle and so there is a higher probability of persons being located here than at the front or rear of the vehicle. With the conducting arrangement, the shock wave can be guided for example toward the axles or wheels, so that the shock wave propagates not at all or only very weakened to the side of the vehicle. Of course, the conducting arrangement can be configured and arranged in any desired manner, in order to guide the shock wave in at least one direction depending on the configuration of the vehicle and the arrangement of the pressure vessel in the vehicle.

Thus, according to one preferred embodiment, it is provided that the at least one outlet opens the space to the front or rear with respect to the vehicle. In particular, there are at least two outlets, one opening the space to the front and the other to the rear.

Preferably, in addition to the at least one outlet, several of the openings are provided which open the space to the side and/or downward with respect to the vehicle. The individual opening is preferably smaller than the outlet.

The vehicle preferably comprises an underbody panel. The conducting arrangement prior to the expansion of the space, i.e., during the normal use of the vehicle, is arranged on the underbody panel and/or integrated in the underbody panels.

When arranged on the underbody panel, the conducting arrangement can lie against the underbody panel or is fastened to the underbody panel, for example.

When the conducting arrangement is integrated in the underbody panel, the conducting arrangement is situated at least partly in the underbody panel. For example, the underbody panel is made from a fiber-reinforced plastic and the conducting arrangement is joined by material bonding to the underbody panel. The conducting arrangement may also be a laminated layer of the underbody panel, which is accordingly easily peeled off.

When the conducting arrangement is arranged on the underbody panel or when the conducting arrangement is integrated in the underbody panel, it is preferably provided that the conducting arrangement is present in the form of the described tube or bag.

Alternatively to the design of the conducting arrangement in the form of the tube or bag, the conducting arrangement may also partly be formed by the bottom of the vehicle. The expandable space here is bounded by the bottom of the vehicle and by a further element. This further element is in particular a flat element, for example formed by a plate, a textile, a netting or a film. The further element is located beneath the bottom of the vehicle and lies for example against the underbody panel. The further element is connected accordingly to the bottom of the vehicle. The shock wave opens up this space between the further element and the bottom of the vehicle.

In particular, it is provided that this further element is the underbody panel itself. Thus, the conducting arrangement comprises the bottom of the vehicle and the underbody panel, while the expandable space is formed and bounded by the bottom of the vehicle and the underbody panel.

Preferably, the conducting arrangement comprises at least one side element which connects the further element, especially the underbody panel, to the bottom of the vehicle. The closed regions of the conducting arrangement are thus formed by the bottom of the vehicle, the further element (especially the underbody panel) and the at least one side element.

The side element is preferably configured such that, when the space is opened up, it enables a change in the distance between the underbody panel and the bottom of the vehicle and bounds the expanded space at the side. The at least one side element for this purpose is in particular elastically and/or plastically deformable and/or present in the folded-up, crumpled-up and/or rolled-up form. As soon as the shock wave enters the space between the bottom of the vehicle and the underbody panel, the space opens up further. An exiting of the shock wave to the side is limited by the at least one side element. The exit from the space is situated preferably at the front side and/or rear side of the vehicle.

The use of the pressure vessel arrangement is described here with the aid of a vehicle. However, the pressure vessel arrangement may also be used with any other mobile and/or stationary pressure vessels.

Other objects, advantages and novel features of the present invention will become apparent from the following detailed description of one or more preferred embodiments when considered in conjunction with the accompanying drawings.

DETAILED DESCRIPTION OF THE DRAWINGS

The figures show purely schematic views of a pressure vessel arrangement 1 in a vehicle 2 in order to illustrate the technology disclosed here.

Figure 1:
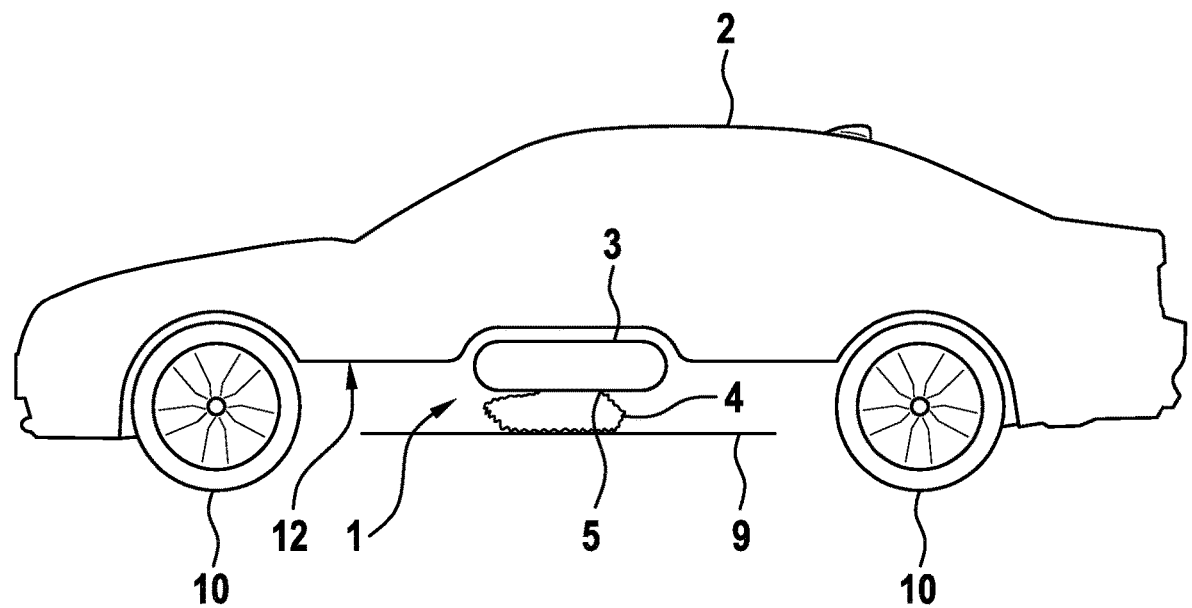
FIG. 1 illustrates a vehicle with the disclosed pressure vessel arrangement prior to the bursting of the pressure vessel.
Figure 2:
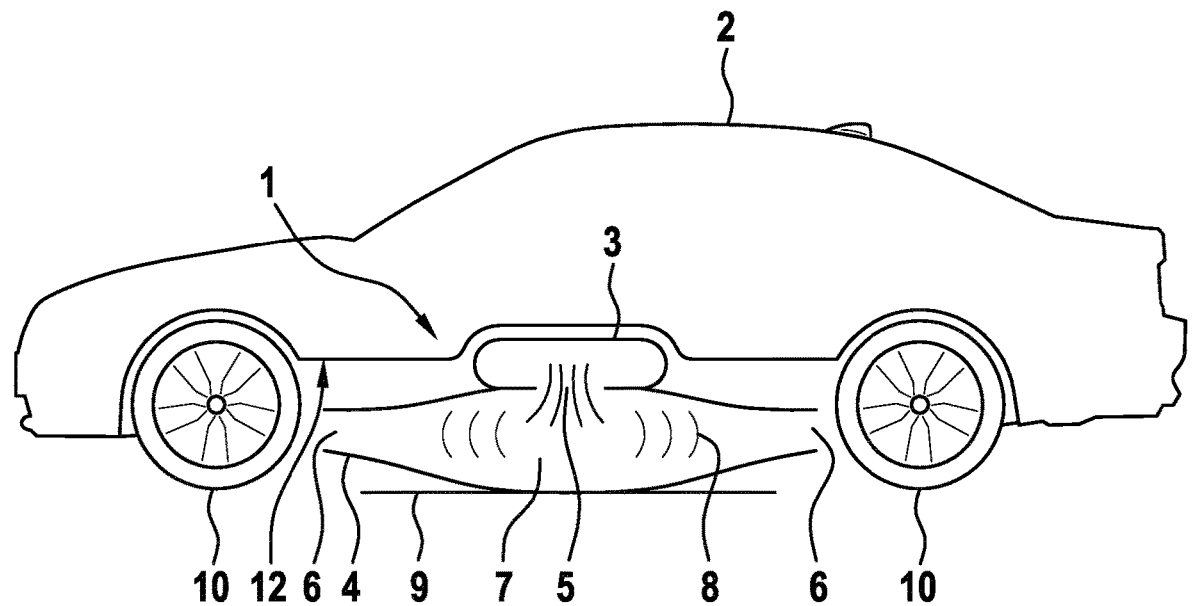
FIGS. 2 and 3 illustrate the vehicle of FIG. 1 during the bursting of the pressure vessel.
Figure 3:
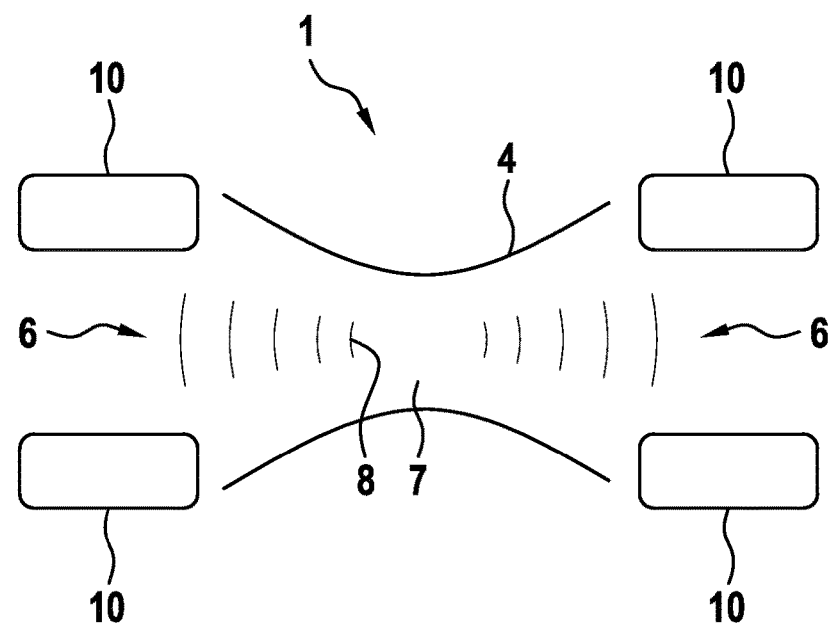

According to FIGS. 1 to 3, the vehicle 2 comprises the pressure vessel arrangement 1. The pressure vessel arrangement 1 comprises a pressure vessel 3 and a conducting arrangement 4 in the vehicle 2.

FIG. 1 shows the normal condition of the vehicle 2. FIGS. 2 and 3 show a condition during the bursting of the pressure vessel 3.

The vehicle 2 comprises an underbody panel 9. The conducting arrangement 4 is located between the underbody panel 9 and a bottom 12 of the vehicle 2.

The conducting arrangement 4 in the example shown is configured as a tube. The conducting arrangement 4 comprises an inlet 5. The inlet 5 is located directly on the pressure vessel 3. In the normal condition per FIG. 1, the conducting arrangement 4 is folded-up, crumpled-up and/or rolled-up. FIGS. 2 and 3 show that the conducting arrangement 4 has two outlets 6. When the pressure vessel 3 bursts, a shock wave 8 emerging from the pressure vessel 3 enters the conducting arrangement 4 through the inlet 5. In this way, a space 7 opens up in the interior of the conducting arrangement 4. The conducting arrangement 4 in the example shown has closed regions at the side of the vehicle, which largely prevent a propagation of the shock wave 8 to the side of the vehicle. The outlets 6 are situated toward the two axles or the wheels 10 of the vehicle 2, so that the shock wave 8 is conducted to the front and rear with respect to the vehicle 2. This is only one of many possibilities for conducting the shock wave 8. Depending on the vehicle 2 and the configuration and arrangement of the pressure vessel 3 in the vehicle 2, a conducting of the shock wave 8 in other directions may also be sensible. Thus, for example, the conducting arrangement 4 may additionally contain side openings through which a portion of the shock wave 8 is diverted and thereby dispersed, especially to the side of the vehicle 2. In this way, the shock wave 8 is diverted into the surroundings and thereby weakened not only through the described outlets 6, but also through the further openings.

Figure 4:
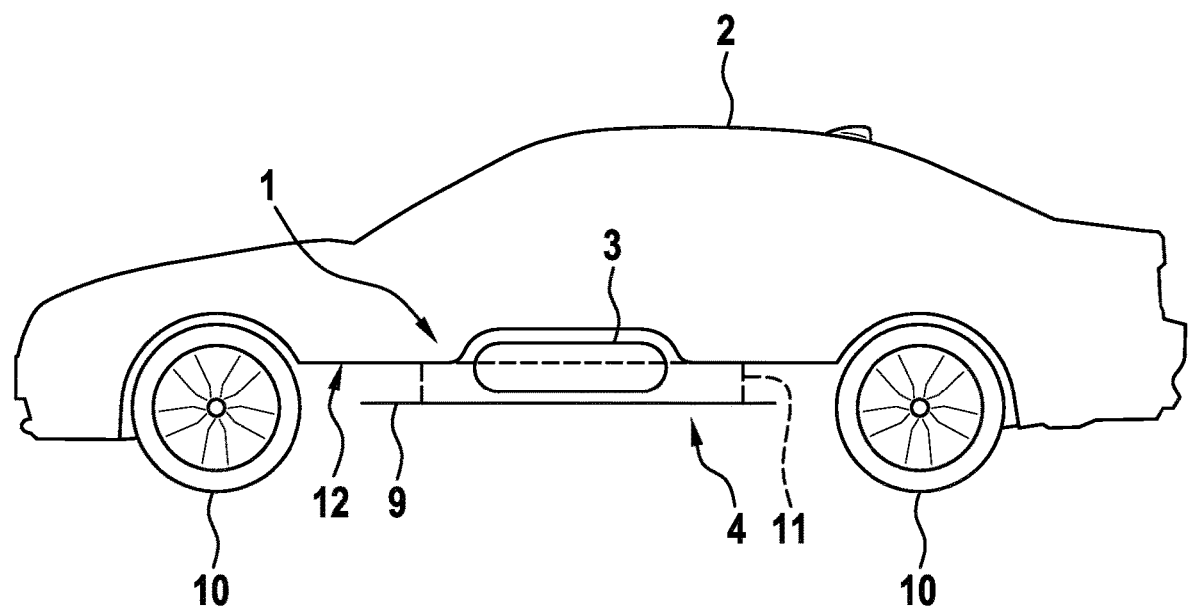
FIG. 4 illustrates a further configuration of the vehicle with the disclosed pressure vessel arrangement prior to the bursting of the pressure vessel.
Figure 5:
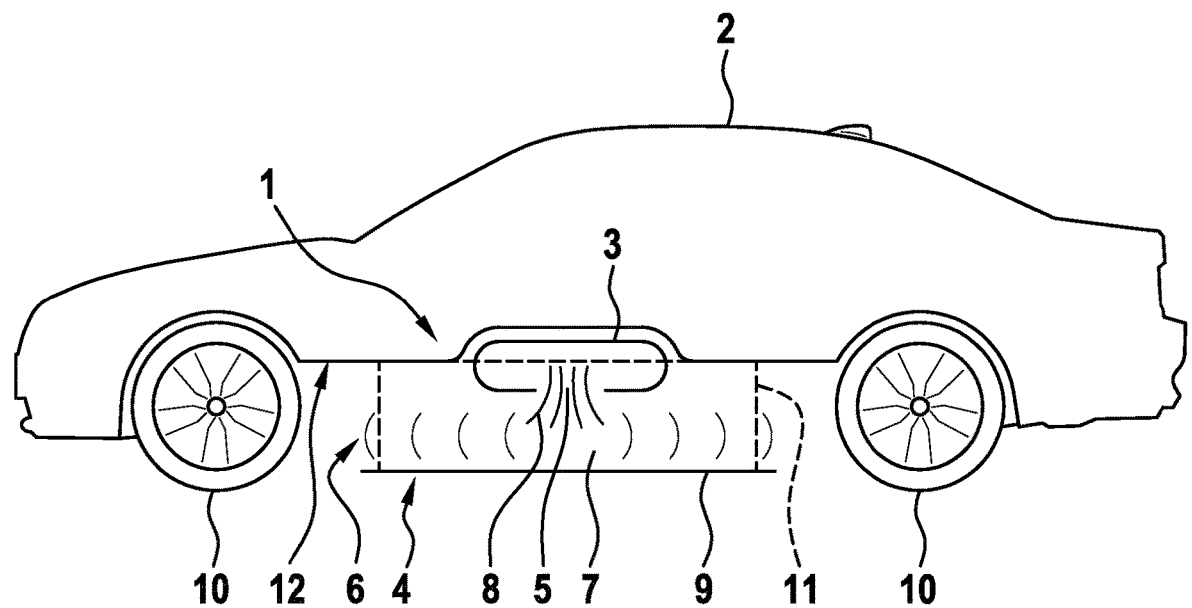
FIG. 5 illustrates the vehicle of FIG. 4 during the bursting of the pressure vessel.
Figure 6:
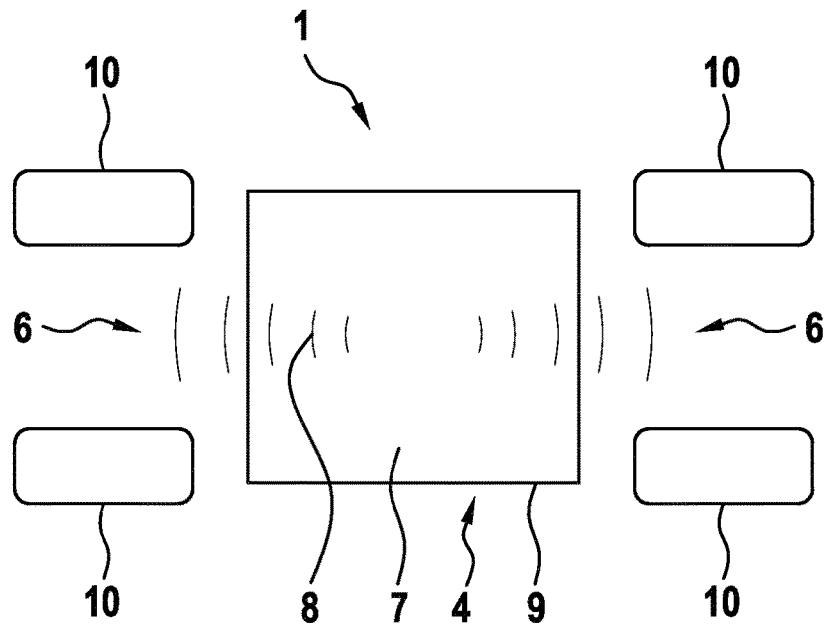
FIG. 6 illustrates the vehicle of FIG. 4 during the bursting of the pressure vessel.

FIG. 4 shows an alternative design, the normal condition of the vehicle 2 being shown in FIG. 4. FIGS. 5 and 6 show a condition during the bursting of the pressure vessel 3.

In FIGS. 4 to 6, the conducting arrangement 4 is formed by the bottom 12 of the vehicle 2, the underbody panel 9 and side elements 11. The side elements 11 join the underbody panel 9 to the bottom 12 of the vehicle 2. The side elements 11 make possible a changing of the spacing between the bottom 12 and the underbody panel 9.

The expandable space 7 is formed here and bounded by the bottom 12, the underbody panel 9 and the side elements 11. The side elements 11 are arranged at the side with respect to the vehicle 2, so that the space 7 comprises the outlets 6 toward the front side and rear side of the vehicle 2. In this way, the shock wave 8 entering into the space 7 can emerge through the outlets 6 in the direction of the axles or the wheels 10 of the vehicle 2.

The preceding description of the present invention serves only for illustrative purposes and not for the purpose of limiting the invention. Various changes and modifications are possible within the context of the invention, without leaving the scope of the invention or its equivalents.

LIST OF REFERENCE SYMBOLS 1 pressure vessel arrangement
2 vehicle
3 pressure vessel
4 conducting arrangement
5 inlet
6 outlet
7 space
8 shock wave
9 underbody panel 10 wheels
11 side element
12 bottom of the vehicle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressure vessel arrangement, comprising:
a pressure vessel for storing a gaseous fuel; and
a conducting arrangement situated adjacent to the pressure vessel for conducting a shock wave arising upon bursting of the pressure vessel,
wherein the conducting arrangement forms a space expandable by the shock wave,
wherein the conducting arrangement comprises an inlet into the space, facing toward the pressure vessel, by which the shock wave enters into the space and opens up the space, and
wherein the conducting arrangement comprises at least one outlet from the space, through which the shock wave leaves the space heading toward the surroundings.

2. The pressure vessel arrangement according to claim 1, wherein
the conducting arrangement weakens the shock wave in addition to conducting the shock wave.

3. The pressure vessel arrangement according to claim 1, wherein
the conducting arrangement is formed of an elastic material, at least for a section.

4. The pressure vessel arrangement according to claim 1, wherein
the conducting arrangement is formed of a plastically deformable material, at least for a section.

5. The pressure vessel arrangement according to claim 1, wherein
the conducting arrangement, prior to expanding the space, is present at least for a section in a folded-up, crumpled-up and/or rolled-up form.

6. The pressure vessel arrangement according to claim 1, wherein
the conducting arrangement comprises multiple openings, leading out from the space, each opening being smaller than the at least one outlet, through which the shock wave emerges from the space into the surroundings.

7. The pressure vessel arrangement according to claim 1, wherein
the conducting arrangement is formed at least for a section from a netting, a fabric and/or a film.

8. The pressure vessel arrangement according to claim 1, wherein
the conducting arrangement is formed at least for a section by a bag or a tube, with the inlet leading into the interior of the bag or tube.

9. The pressure vessel arrangement according to claim 1, wherein
an overall surface of the expanded space is enclosed by the conducting arrangement for at least 30%, and the remaining portion of the overall surface is open through the inlet and the at least one outlet.

10. The pressure vessel arrangement according to claim 1, wherein
an overall surface of the expanded space is enclosed by the conducting arrangement for at least 50%, and the remaining portion of the overall surface is open through the inlet and the at least one outlet.

11. The pressure vessel arrangement according to claim 1, wherein
an overall surface of the expanded space is enclosed by the conducting arrangement for at least 70%, and the remaining portion of the overall surface is open through the inlet and the at least one outlet.

12. The pressure vessel arrangement according to claim 1, wherein
the conducting arrangement is secured to the pressure vessel or a structure arranged above the pressure vessel and receiving the pressure vessel.

13. A vehicle, comprising a pressure vessel arrangement according to claim 1.

14. The vehicle according to claim 13, further comprising:
an underbody panel, wherein the conducting arrangement, prior to expansion of the space, is arranged on the underbody panel and/or integrated in the underbody panel.

15. The vehicle according to claim 13, wherein
the expandable space is partly formed and bounded by a bottom of the vehicle.

16. The vehicle according to claim 15, further comprising:
an underbody panel, wherein
the conducting arrangement comprises the bottom of the vehicle and the underbody panel, while the expandable space is formed and bounded by the bottom of the vehicle and the underbody panel.

17. The vehicle according to claim 16, wherein
the conducting arrangement comprises at least one side element which connects the underbody panel to the bottom of the vehicle, such that, when the space is expanded, the at least one side element enables a change in distance between the underbody panel and the bottom of the vehicle and bounds the expanded space at the side.

18. The vehicle according to claim 13, wherein
the at least one outlet opens the space to the front or rear with respect to the vehicle.

19. The vehicle according to claim 18, wherein
multiple openings are provided, which open the space to the side and/or downward with respect to the vehicle.

* * * * *